(12) United States Patent
Liao et al.

(10) Patent No.: US 8,947,997 B2
(45) Date of Patent: Feb. 3, 2015

(54) APPARATUSES AND METHODS FOR DETECTING A GROUP DELAY IN A COMMUNICATION SYSTEM

(75) Inventors: Jingyi Liao, Solna (SE); Zhangyong Ma, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 350 days.

(21) Appl. No.: 13/503,875

(22) PCT Filed: Oct. 27, 2009

(86) PCT No.: PCT/CN2009/001195
§ 371 (c)(1),
(2), (4) Date: Jun. 21, 2012

(87) PCT Pub. No.: WO2011/050490
PCT Pub. Date: May 5, 2011

(65) Prior Publication Data
US 2012/0250493 A1     Oct. 4, 2012

(51) Int. Cl.
*H04J 11/00*     (2006.01)
*H04W 4/00*     (2009.01)
*H04J 3/06*     (2006.01)
*H04L 5/00*     (2006.01)
*H04L 27/26*     (2006.01)

(52) U.S. Cl.
CPC .......... *H04L 5/0017* (2013.01); *H04L 27/2634* (2013.01); *H04L 27/2602* (2013.01)
USPC ............................ 370/210; 370/330; 370/350

(58) Field of Classification Search
None
See application file for complete search history.

(56) References Cited

U.S. PATENT DOCUMENTS

| 2007/0171889 | A1* | 7/2007 | Kwon et al. | 370/350 |
| 2009/0252112 | A1* | 10/2009 | Shimomura et al. | 370/330 |
| 2011/0299384 | A1* | 12/2011 | McCoy | 370/210 |

FOREIGN PATENT DOCUMENTS

| CN | 1553621 A | 12/2004 |
| CN | 101227443 A | 7/2008 |
| EP | 1811691 A2 | 7/2007 |
| WO | 2008/038248 A2 | 4/2008 |

* cited by examiner

*Primary Examiner* — Chirag Shah
*Assistant Examiner* — Srinivasa Reddivalam
(74) *Attorney, Agent, or Firm* — Murphy Bilak & Homiller, PLLC

(57) ABSTRACT

The exemplary embodiments of the present invention relate to a transmission part (500), to a receiver part (600), to a transceiver comprising the transmission and receiver parts, to a radio base station comprising the transceiver, to a method in the transmission part (500) and to a method in a receiver part (600). According to the embodiments of the present invention, the transmission part (500) is configured to generate calibration sequences; process the sequences to determine a resulting calibration signal prior to transmission to a receiver part for enabling the receiver part to detect group delay of the received resulting calibration signal for calibration of the transceiver and/or of the radio base station in a wideband communications system.

13 Claims, 11 Drawing Sheets

Table 1 Simultation Parameters

| PARAMETER | VALUE |
|---|---|
| M | 839 |
| J | 8 |
| N | 24576 |
| T | 2048 |
| Root Number | 265 |
| Cyclic Shift Number | 93 |

FIGURE 7A

Table 2 Probability Of Group Delay

| SNR(dB) | Probability of $\hat{\Gamma}_i$ |
|---|---|
| 30 | 100% |
| 32 | 100% |
| 34 | 100% |
| 36 | 100% |
| 38 | 100% |

FIGURE 7B

APPARATUSES AND METHODS FOR DETECTING A GROUP DELAY IN A COMMUNICATION SYSTEM

TECHNICAL FIELD

The present invention relates generally to the field of communication systems, and, more specifically, to apparatuses and methods for detecting a group delay in a communication system for enabling calibration of the radio base station.

BACKGROUND

The 3rd Generation Partnership Project (3GPP) is responsible for the standardization of the UMTS (Universal Mobile Telecommunication Service) system, and LTE is currently under discussion as a next generation mobile communication system of the UMTS system. LTE is a technology for realizing high-speed packet-based communication that can reach high data rates both in the downlink and in the uplink. The 3GPP work on LTE is also referred to as Evolved Universal Terrestrial Access Network (E-UTRAN). Thus work is ongoing in 3GPP to specify an evolution to UTRAN, denoted E-UTRA, as part of the LTE effort. The first release of LTE, referred to as release-8 (Rel-8) can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least frequency division duplex (FDD) and time division duplex (TDD). Other operation modes can also be used. The modulation technique used in LTE is known as OFDM (Orthogonal Frequency Division Multiplexing).

For the next generation mobile communications system e.g. IMT-advanced and/or LTE-advanced, which is an evolution of LTE, support for bandwidths of up to 100 MHz is being discussed. One issue with such wide bandwidth is that it is challenging to find free 100 MHz of contiguous spectrum, due to that radio spectrum a limited resource.

LTE-advanced can be viewed as a future release, denoted release-10 (Rel-10) of the LTE standard and since it is an evolution of LTE, backward compatibility is important so that LTE-advanced can be deployed in spectrum already occupied by LTE (e.g. Rel-8). This means that for an LTE user equipment or a LTE terminal, a LTE-advanced capable network can appear as a LTE network. In both LTE and LTE-advanced radio base stations known as eNBs or eNodeBs—where e stands for evolved—, multiple antennas with beamforming technology can be adopted in order to provide high data rates to user equipments.

As mentioned earlier, LTE-advanced can support 100 MHz of bandwidth. This can be performed by aggregating non-contiguous spectrum, to create, from e.g. a baseband point of view, a larger system bandwidth. This is also known as carrier-aggregation, where multiple component carriers are aggregated to provide a larger bandwidth. The scalable bandwidth makes it more difficult to ensure that the overall channel response of the radio frequency (RF) chain of a eNodeB does not suffer from significant variations over frequency of the communication channel. If the channel response of the RF chain is not properly dealt with, the system may suffer from a substantial increase of frequency-selectivity as well as the performance of beamforming or pre-coding. Another concern relating to frequency selectivity and it impact on the performance of a system is the so called group delay. In general, the group delay is defined as a measure of the transit time of a signal through a device/apparatus/component versus frequency. The impact of group delay is more pronounced for wideband systems than in small band systems due to the substantial increase of frequency-selectivity. This will impact on antenna calibration.

In prior art technical documentation G. Tsoulos, J. McGeehan and M. Beach, "*Space division multiple access (SDMA) field trails. Part 2: Calibration and linearity issue,*" *IEE Proc-Radar, Sonar Navig.*, Vol. 145, No. 1, February 1998; It is shown that there is approximately 2-3 dB reduction in the null depth between the 0 and 1% carrier frequency bandwidth case, however with 10% bandwidth the null is approximately 23 dB and 26 dB compared to that with the 0% bandwidth case. For example, if the carrier frequency is 2 GHz, the allowable frequency-independent bandwidth is less than 20 MHz. For systems with a bandwidth with more than 40 MHz, calibration is required for digital beamforming system in different frequencies. In order to achieve reliable and good system performance, calibration or antenna calibration is thus required. Especially for wideband systems such as LTE or TDD-LTE, the calibration across the transceiver RF chain of a radio base station e.g. a eNodeB is important for achieving adequate channel reciprocity and for effectively exploiting the channel reciprocity, since RF calibration mismatch degrades the reciprocity and impacts on the antenna gain(s). It should be mentioned that channel reciprocity means that the upstream (or uplink) and downstream (or downlink) channels are essentially the same.

As mentioned earlier, group delay impacts on the performance of a system. In order to reduce or eliminate negative this effect, group delay should be detected and dealt with properly. An interface known as CPRI (Common Public Radio Interface) comprised in a radio base station is generally used to detect a delay, but only the delay which is induced by e.g. cable length which can be detected and calibrated for by means of the CPRI as described in "*CPRI specification Interface Specification, February 2009*". In other words, the CPRI interface is not suitable to use for detecting the group delay and for calibrating for group delay induces in the radio base station. This also means that when the available wide bandwidth is divided into multiple frequency groups (or subbands) such as in the OFDM based-system LTE or LTE-advanced, the induced group delay of each subband cannot be detected and calibrated using the CPRI interface.

SUMMARY

An object of the exemplary embodiments of the present invention is thus to address the above mentioned problem by providing a transmission part, a receiver part, a transceiver and a radio base station of a wideband communication system, for detecting a group delay for performing reliable calibration so that the system performance is not unnecessarily reduced and the reciprocity and the antenna gains are not degraded.

According to an aspect of exemplary embodiments of the present invention, the above stated problem is solved by means of a transmission part of a transceiver for a radio base station in a wideband communication system, for enabling detection of a group delay for performing calibration. The transmission part is configured to split an available system bandwidth into multiple groups of contiguous subcarriers, each group representing a subband of the available bandwidth. The transmission part is further configured to generate, for each subband, a constant amplitude zero auto correlation (CAZAC) calibration sequence having a predefined length (M). The CAZAC calibration sequence is generated in time domain. The transmission part is further configured to convert each CAZAC calibration sequence into frequency domain by using a M-points FFT operation where M represents the number of contiguous subcarriers for each subband. The transmission part is further configured to map each converted CAZAC calibration sequence into a dedicated subband and to further superimpose the mapped CAZAC calibration sequences to form a CAZAC calibration signal. The CAZAC calibration signal is then transformed from frequency domain into time domain using an N-points IFFT operation, where N is a length of a symbol. The transmission part is further configured to append the transformed CAZAC calibration signal with a cyclic prefix (CP) to form a resulting CAZAC calibration signal. The transmission part is further configured to upconvert the resulting CAZAC calibration signal to a carrier frequency prior to transmission, the resulting CAZAC calibration signal passing a radio frequency (RF) chain before reaching a receiver part of the transceiver for detecting the group delay.

According to another aspect of exemplary embodiments of the present invention, the above stated problem is solved by means of a receiver part of a transceiver for a radio base station in a wideband communication system, for detecting a group delay for performing calibration, and wherein an available system bandwidth is split into multiple (J) groups of contiguous subcarriers, each group of contiguous subcarriers representing a subband of the available bandwidth. The receiver part is configured to receive a resulting CAZAC calibration signal generated by the transmission part according to the above described aspect of the exemplary embodiments of the present invention. The receiver part is further configured to downconvert the received resulting CAZAC calibration signal into a baseband CAZAC calibration signal. The receiver part is further configured to remove a cyclic prefix (CP) of the baseband CAZAC calibration signal and to transform the baseband CAZAC calibration signal from time domain to frequency domain using a N-points FFT operation, where N is a length of a symbol. The receiver part is further configured to extract from the transformed CAZAC calibration signal, CAZAC calibration sequences of a predefined length M and to map each extracted CAZAC calibration sequence into a dedicated subband of the available bandwidth. The receiver part is further configured, for each mapped CAZAC calibration sequence, to determine a recovered CAZAC calibration sequence by multiplying a predefined conjugated frequency response of the mapped CAZAC calibration sequence with the corresponding mapped CAZAC calibration sequence. The receiver part is further configured to convert each recovered CAZAC calibration sequence into time domain using an IFFT operation, the IFFT having a predefined number of points T. The receiver part is further configured to jointly estimate, for each converted recovered CAZAC calibration sequence, a group delay by selecting a maximum amplitude value of the converted recovered CAZAC calibration sequence and determining a corresponding time index where the maximum amplitude value occurs.

According to yet another aspect of the exemplary embodiments of the present invention, the above stated problem is solved by means of a transceiver comprising the transmission part and the receiver part as described above.

According to yet another aspect of the exemplary embodiments of the present invention, the above stated problem is solved by means of a radio base station comprising the transceiver part described above.

According to a further aspect of the exemplary embodiments of the present invention, the above stated problem is solved by means of a method in a transmission part of a transceiver for a radio base station of a wideband communication system, for enabling detection of a group delay for performing calibration, the method comprises: splitting an available system bandwidth into multiple (J) groups of contiguous subcarriers, each group of contiguous subcarriers representing a subband of the available bandwidth; generating in time domain, for each subband of the available bandwidth, a CAZAC calibration sequence having a predefined length (M); converting each CAZAC calibration sequence into frequency domain by using a M-points FFT operation where M represents the number of contiguous subcarriers for each subband; mapping each converted CAZAC calibration sequence into a dedicated subband; superimposing the mapped CAZAC calibration sequences to form a CAZAC calibration signal which is further transformed from frequency domain into time domain using an N-points IFFT operation, where N is a length of a symbol; appending the transformed CAZAC calibration signal with a cyclic prefix (CP) to form a resulting CAZAC calibration signal; and upconverting the resulting CAZAC calibration signal to a carrier frequency prior to transmitting the upconverted resulting CAZAC calibration signal, said transmitted resulting CAZAC calibration signal passing a radio frequency, RF, chain before reaching a receiver part of the transceiver.

According to yet another aspect of exemplary embodiments of the present invention, the above stated problem is solved by means of a method in a receiver part of a transceiver for a radio base station in a wideband communication system, for detecting a group delay for performing calibration, and wherein an available system bandwidth is split into multiple (J) groups of contiguous subcarriers, each group of contiguous subcarriers representing a subband of the available bandwidth. The method comprises: receiving from the transmission part a resulting CAZAC calibration signal generated by the transmission part according to exemplary embodiments of the present invention; downconverting the received resulting CAZAC calibration signal into a baseband CAZAC calibration signal; removing a cyclic prefix (CP) of the baseband CAZAC calibration signal and transforming the baseband CAZAC calibration signal from time domain to frequency domain using a N-points FFT operation, where N is a length of a symbol; extracting from the transformed CAZAC calibration signal, CAZAC calibration sequences, each CAZAC calibration sequence having a predefined length M; mapping each extracted CAZAC calibration sequence of length M into a dedicated subband of the available bandwidth; determining for each mapped CAZAC calibration sequence, a recovered CAZAC calibration sequence by multiplying a predefined conjugated frequency response of the mapped CAZAC calibration sequence with the corresponding mapped CAZAC calibration sequence; converting each recovered CAZAC calibration sequence into time domain using an IFFT, IFFT, operation, the IFFT having a predefined number of points T; and jointly estimating, for each converted recovered CAZAC calibration sequence, a group delay by selecting a maximum amplitude value of the converted recovered CAZAC calibration sequence and determining a corresponding time index where the maximum amplitude value occurs.

An advantage of the exemplary embodiments of the present invention is to jointly detect and estimate the group delay of each subband of the available bandwidth for achieving reliable calibration of the radio base station so that reciprocity and antenna gain(s) are not unnecessarily degraded.

Another advantage of the exemplary embodiments of the present invention is to improve the performance of the wideband communication system.

Yet another advantage of the exemplary embodiments of the present invention is to may full use of the energy accumulation so that the system is resistant to random noise.

A further advantage of the exemplary embodiments of the present invention is to spread the group delay detection range.

Still other advantages, objects and features of the exemplary embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims.

BRIEF DESCRIPTION OF THE DRAWINGS

FIG. 7A illustrates exemplary values of simulation parameters used when implementing the teaching of the exemplary embodiments of the present invention.

FIG. 7B illustrates a result of a simulation presenting probability of group delay detection versus SNR.

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention and its embodiments may be practiced in other embodiments that depart from these specific details.

The exemplary embodiments of the present invention are described herein by way of reference to particular example structures. In particular the invention is described in a non-limiting general context in relation to a wideband system wherein LTE-based (LTE and/or LTE-advanced) radio base stations i.e. eNodes are employed. It should be noted that the present invention and its exemplary embodiments may also be applied to other types of radio technologies and architectures employing radio base stations deployed in wideband systems.

The exemplary embodiments of the present invention relate to a transmission part and method thereof; a receiver part and method thereof; a transceiver comprising the transmission part and the receiver part and a radio base station including the transceiver. The transmission part comprises a plurality of transmission chains and the receiver part comprises a plurality of reception chains. Each transmission/reception chain includes RF components, such as amplifiers, mixers, cables etc. The transmission part further includes a digital upconverter (DUC) and a digital to analog converter (DAC). The receiver part further includes an analog to digital converter (ADC). The transmission part respectively the receiver part further comprises or are connected to one or several antennas to be able to transmit respectively receive signals. The combination of a transmission part and a receiver part is denoted here a transceiver. Before describing the functions of the transmission part respectively the receiver part in accordance with the exemplary embodiments of the present invention, exemplary structures of a transceiver suitable for implementing in a radio base station are first described in conjunction to FIGS. 1-4.

Figure 1:
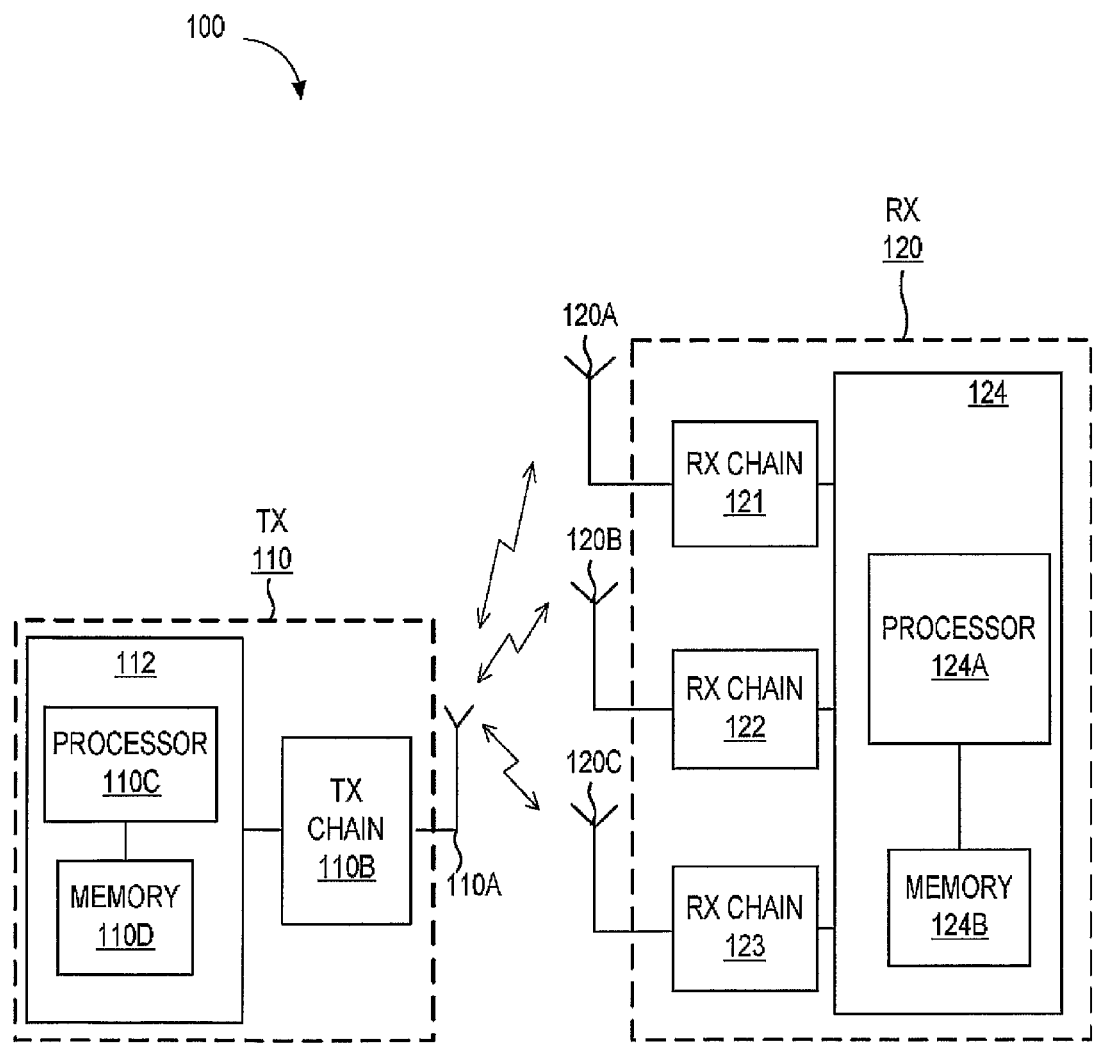
FIG. 1 illustrates a simplified block diagram of a transceiver.

Referring to FIG. 1 there is depicted an exemplary embodiment of a transceiver 100 comprising a transmission part 110 and a receiver part 120. The transmission part 110 is denoted TX and the receiver part 120 is denoted RX. In this example, TX 110 is shown comprising a single antenna 110A coupled to a TX chain 110B connected or coupled to a processing unit 112 comprising a (micro) processor 110C and a memory unit 110D shown connected to the processor 110C. Receiver part RX 120 in this exemplary embodiment shown is shown comprising three antennas 120A, 120B and 120C. Antenna 120A is coupled to a RX chain 121, antenna 120B is coupled to a RX chain 122 and antenna 120C is coupled to RX chain 123. RX 120 also comprises a processing unit 124 including a (micro) processor 124A and a memory unit 124B. It should be mentioned that additional components units and/or circuitry can be present in the transceiver 100 such as additional antennas in TX 110 and/or additional or fewer antennas in RX 120 etc. A signal processed by the TX 110 passes a RF chain (not shown) prior to reaching RX 120.

Figure 2:
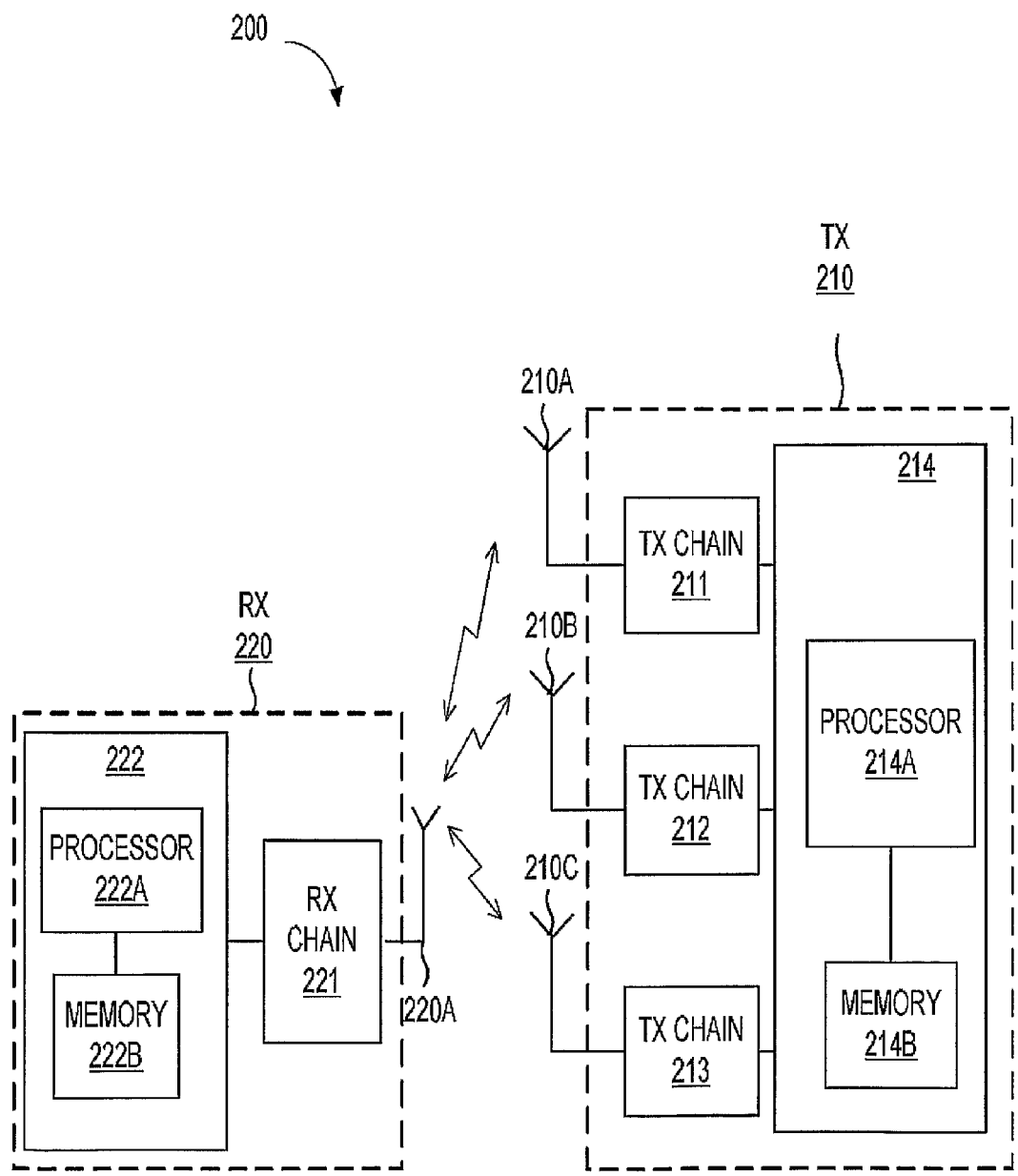
FIG. 2 illustrates a simplified block diagram of another transceiver.

Referring to FIG. 2 there is illustrated another exemplary embodiment of a transceiver 200 comprising a TX part 210 and a RX part 220. As shown TX 210 includes in this example three antennas 210A, 210B and 210C respectively, each connected to a respective TX chain 212, 213 and 213 respectively. Each TX chain is further connected to processing unit 214 comprising a (micro) processor 214A and a memory unit 214B. The receiver part RX 220 is instead shown comprising a single antenna 220A connected to RX chain 221 which is further connected to processing unit 222 including a (micro) processor 222A and a memory unit 222B. Signals processed by TX 210 pass a RF chain (not shown) prior to reaching RX 220. Again, the transceiver 200 and/or TX and RX parts may contain fewer or additional components and/or circuitry and the exemplary embodiments of the present invention are not restricted to the structure shown in FIG. 1 or FIG. 2. Note that in FIG. 1 and FIG. 2 the signal that can be received and/or transmitted also passes wirelessly through the air interface. In other words, TX part and RX part of the transceiver are shown distributed and not directly connected to each other by means of physical cable or cables.

Figure 3:
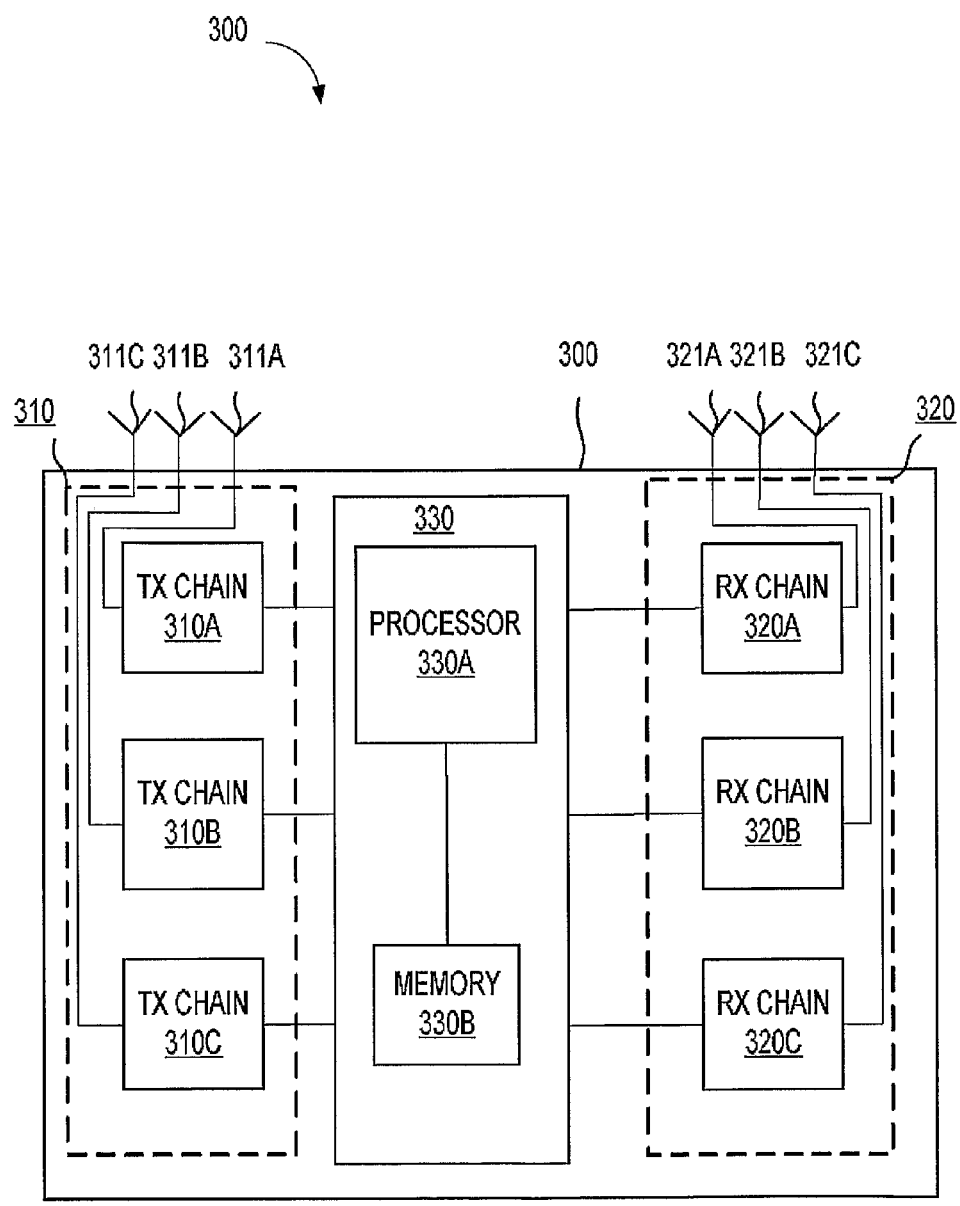
FIG. 3 illustrates a simplified block diagram of yet another transceiver.

Referring to FIG. 3 there is illustrated yet another exemplary embodiment of a transceiver 300 comprising a TX part 310 and a RX part 320 which are cross-connected with each other by means a processing unit 330 comprising a (micro) processor 330A and a memory unit 330B. In other words, TX and RX parts 310A and 320B respectively share the same processing unit 330. TX 310 comprises TX chains 310A, 310B and 310C each connected to a respective antenna 311A, 311B and 311C. RX 320 is shown comprising RX chains 320A, 320B and 320C each connected to a respective antenna 321A, 321B and 321C. TX part 310 and RX part 320 may be regarded as communication circuitry, although they belong to the same transceiver 300. The transceiver 300 can thus be viewed as a transceiver circuitry with integrated TX circuitry and RX circuitry. Note also that the TX and RX antennas are not necessarily separated.

Figure 4:
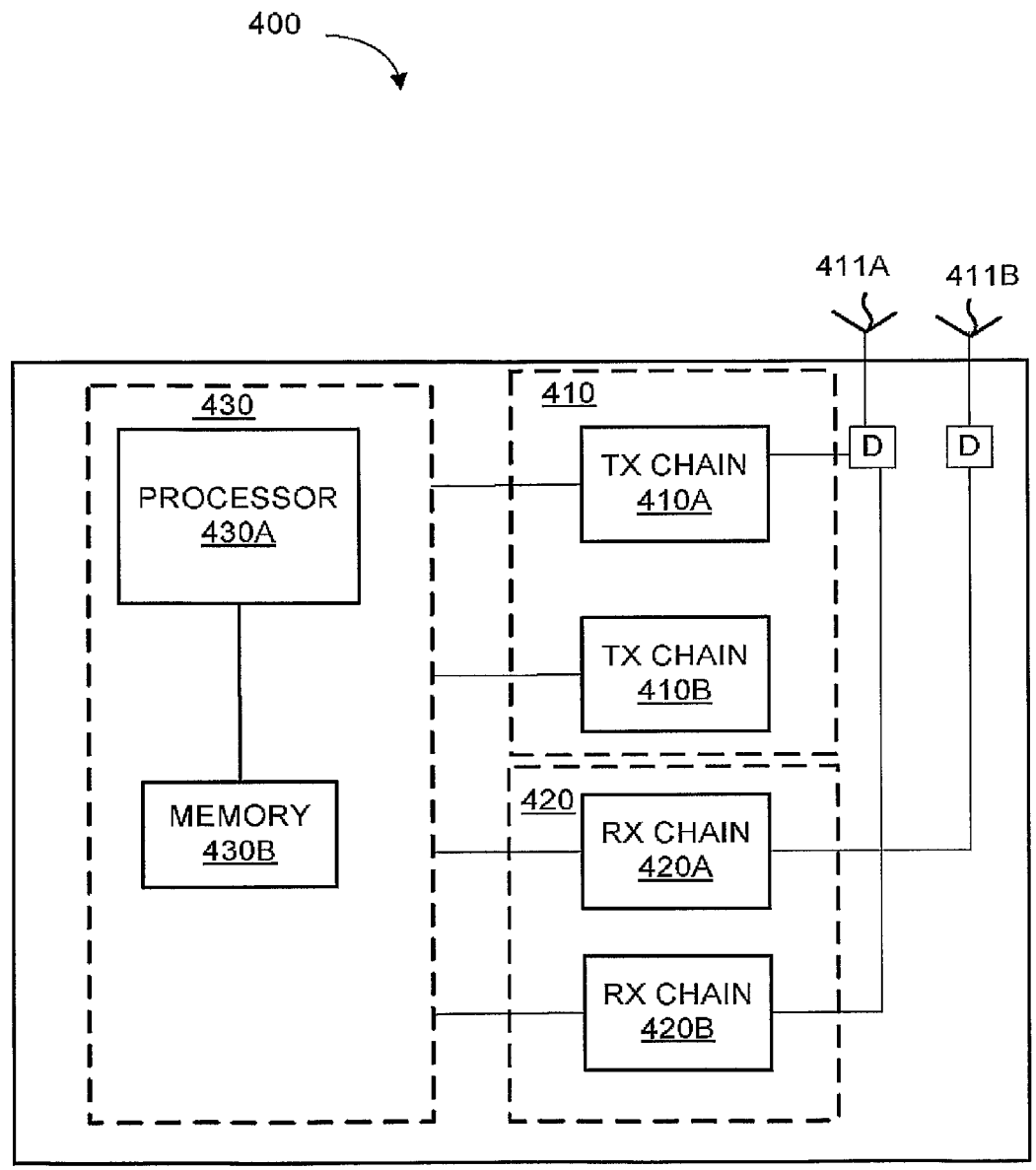
FIG. 4 illustrates a simplified block diagram of further transceiver.

Referring to FIG. 4 there is illustrated a further exemplary embodiment of a transceiver 400 comprising a TX part 410, a RX part 420, a processing unit 430 comprising a processor 430A and a memory unit 430B. In this example, the TX part 410 and the RX part 420 have common antennas 411A, 411B. TX part 410 comprises TX chains 410A, 410B and RX part 420 includes RX chains 420A and 420B. The TX and RX chains are shown connected to each other by means of e.g. a duplex filter denoted D. Note again that in any one of FIGS. 1-4, the transceiver can include additional components, units, circuitry not explicitly shown. Furthermore, the previously described transceivers can be implemented in a radio base station of a wideband communication system such as a eNodeB (not shown).

In the following, the functions of the transmission part respectively the receiver part are presented in accordance with exemplary embodiments of the present invention.

Figure 5:
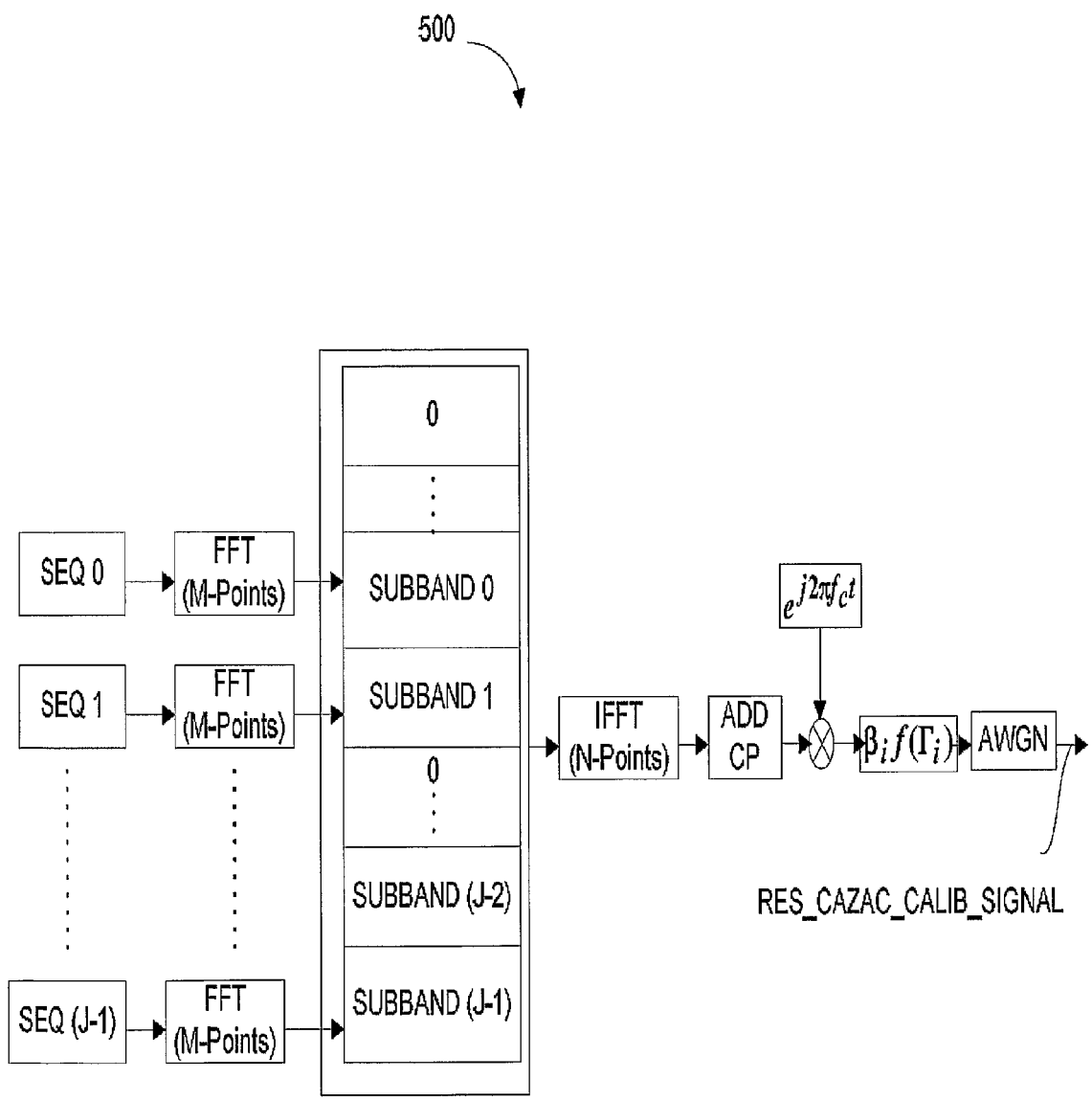
FIG. 5 illustrates an example of a transmission process of a transmission part according to an exemplary embodiment of the present invention.

Referring to FIG. 5 there is illustrated the functions of a transmission part 500 in accordance with an exemplary embodiment of the present invention, for enabling detection of a group delay for performing calibration of the radio base station. The functions of the transmission part can be defined as a transmission process.

The transmission part 500 of FIG. 5, which can be anyone of the previously described and illustrated transmission parts of FIGS. 1-4, is configured to split the available bandwidth into multiple groups (J) of contiguous subcarriers, each group of subcarriers representing a subband of the available bandwidth. This is shown in the block wherein subbands are included and are indexed subband i where i=0, 1, 2, ..., (J-1), where J is a design parameter. As shown in FIG. 5, Subband 0 represents a group of subcarriers; subband 1 represents another group of subcarriers, ..., and subband (J-1) represents a last group of subcarriers. For each subband i and in accordance with the embodiments of the present invention, a M-point constant amplitude zero auto correlation (CAZAC) calibration sequence is generated. Thus for subband 0, a CAZAC sequence indexed 0 is generated; for subband 1, a CAZAC sequence indexed 1 is generated etc. This is shown in FIG. 5 where CAZAC sequence 0 is denoted SEQ 0; CAZAC sequence 1 is denoted SEQ 1, ..., and CAZAC sequence (J-1) is denoted SEQ(J-1). Each CAZAC calibration sequence can be viewed as a reference calibration sequence. An advantage with using a CAZAC sequence is that it has excellent auto-correlation and cyclic-shift zero auto-correlation and it characteristics are remained after it transformations from time domain to frequency domains and/or vice versa, as will be described. The length of each CAZAC calibration sequence M is predefined and is a design parameter. Later some simulation results will be presented based on a predefined number M. Note however that any suitable value of M can be used. Each CAZAC calibration is, according to the exemplary embodiments of the present invention, generated in the time domain. A CAZAC calibration sequence can be expressed by equation (1) below:

$$x_i[n] = \exp(j2\pi(N_{zc}-1)t(t+1)/N_{zc}) \quad (1)$$

where i is, as described above, the index of the $i^{th}$ subband. $N_{zc}$ is a prime number which is rest on the resolution of the transmission link and the bandwidth of the calibrated subband. $N_{zc}$ can be equal to the length of the CAZAC calibration sequence, although this in not necessary. It is here assumed that the group delay in each subband i is the same. t represents a sequence root which is a required parameter for CAZAC definition, and n is the index of the length of the sequence i.e. n=0, 1, 2, ..., M-1.

Referring back to FIG. 5, the transmission part 500 is further configured to convert each CAZAC calibration sequence into frequency domain using a M-points fast Fourier transform (FFT) operation. M also represents the number of subcarriers for each subband. The transformation of each CAZAC calibration sequence leads to a CAZAC calibration sequence $X_i(k)$ in the frequency domain, given by equation (2) below:

$$X_i(k) = \sum_{k=0}^{k=N_{zc}-1} x_i[n]\exp(-j2\pi nk/N) \quad (2)$$

where k is the subcarrier index, and N is the length of a symbol to which the whole available bandwidth is available. It should be mentioned that the frequency response of each CAZAC calibration sequence is here considered known to the receiver part for enabling reliable detection of the group delay in accordance with the exemplary embodiments of the present invention.

When the FFT transformation or conversion has been performed for each CAZAC calibration sequence, the transmission part 500 is configured to map each converted/transformed CAZAC calibration sequence into a dedicated subband i. In other words a converted SEQ 0 is mapped to subband 0; a converted SEQ 1 is mapped to subband 1, etc, as shown in FIG. 5. It should be mentioned that the J subbands represent the available bandwidth that is required for (antenna) calibration purposes. As depicted in FIG. 5, the bandwidth allocated to the J subbands does not represent the entire bandwidth available for the symbol of length N. Therefore, the remaining part of the entire bandwidth is, according to an exemplary embodiment of the present invention, padded with zeros. This padded bandwidth part is (N-J*M).

According to an exemplary embodiment of the present invention, the length N of a symbol aimed to be transmitted, is selected longer than M in order to achieve reliable accuracy when estimating a group delay of a subband.

Referring back to FIG. 5, after the mapping has been performed, the transmission part is configured to superimpose the mapped CAZAC calibration sequences to form a CAZAC calibration signal, denoted here X(k) where k=0, 1, ..., N, which is further transformed from frequency domain into time domain using a N-points inverse FFT operation (IFFT). As mentioned earlier the advantage of using CAZAC calibration sequences is that they have excellent autocorrelation characteristics even when they are transformed from time to frequency domain and vice versa.

After IFFT conversion, the transmission part 500 is configured to append or add to the CAZAC calibration sequence a cyclic prefix (CP) to form a resulting CAZAC calibration sequence. The CP is appended in order to avoid and/or minimize the inter-carrier interference (ICI) in one symbol due to e.g. time delays. Subsequently, the transmission part 500 is configured to upconvert the resulting CAZAC calibration signal to a predetermined carrier frequency denoted $f_c$ by multiplying the resulting CAZAC calibration signal with $e^{j2\pi f_c t}$ as shown in FIG. 5. The upconverted resulting CAZAC calibration signal is further configured to pass the RF chain (not shown) which, as mentioned earlier includes a DUC, DAC etc. The RF chain induces a group delay per subband i. The group delay per subband i is denoted here $\Gamma_i$. The RF chain also induces an amplitude attenuation factor per subband which is denoted $\beta_i$. The amplitude attenuations factors are considered different for different subbands. The induction of the group delay and of the amplitude attenuation per subband is schematically depicted in FIG. 5 by the block denoted $\beta_i \cdot f(\Gamma_i)$ where $f$ represents a function of different group delays in all subbands. As known in the art, white Gaussian noise (AWGN) is almost always involved in communication systems and must be considered. Finally the upconverted resulting CAZAC calibration signal is transmitted before reaching a receiver part for enabling the receiver part to detect the induced group delay (per subband i) for calibration purposes. The transmitted upconverted resulting CAZAC calibration signal is denoted RES_CAZAC_CALIB_SIGNAL and is in time domain.

The above described functions of the transmission part in accordance with the exemplary embodiments of the present invention can be performed by a transmission part circuitry or a circuit of the transmission part or the transmission part circuit or a transmission part processor and/or a combination of the above. In other words, "the transmission part is configured to . . . " describing the functions of the transmission part can instead be rephrased/replaced to/by "the circuit is configured to . . . " or " the transmission part circuit is configured to . . . " or "the circuit of the transmission part is configured to . . . " "the circuitry of the transmission part is configured to . . . " or "the transmission part circuitry is configured to . . . " or " the processor of the transmission part is configured to . . . " or " the transmission part processor is configured to . . . ".

Figure 6:
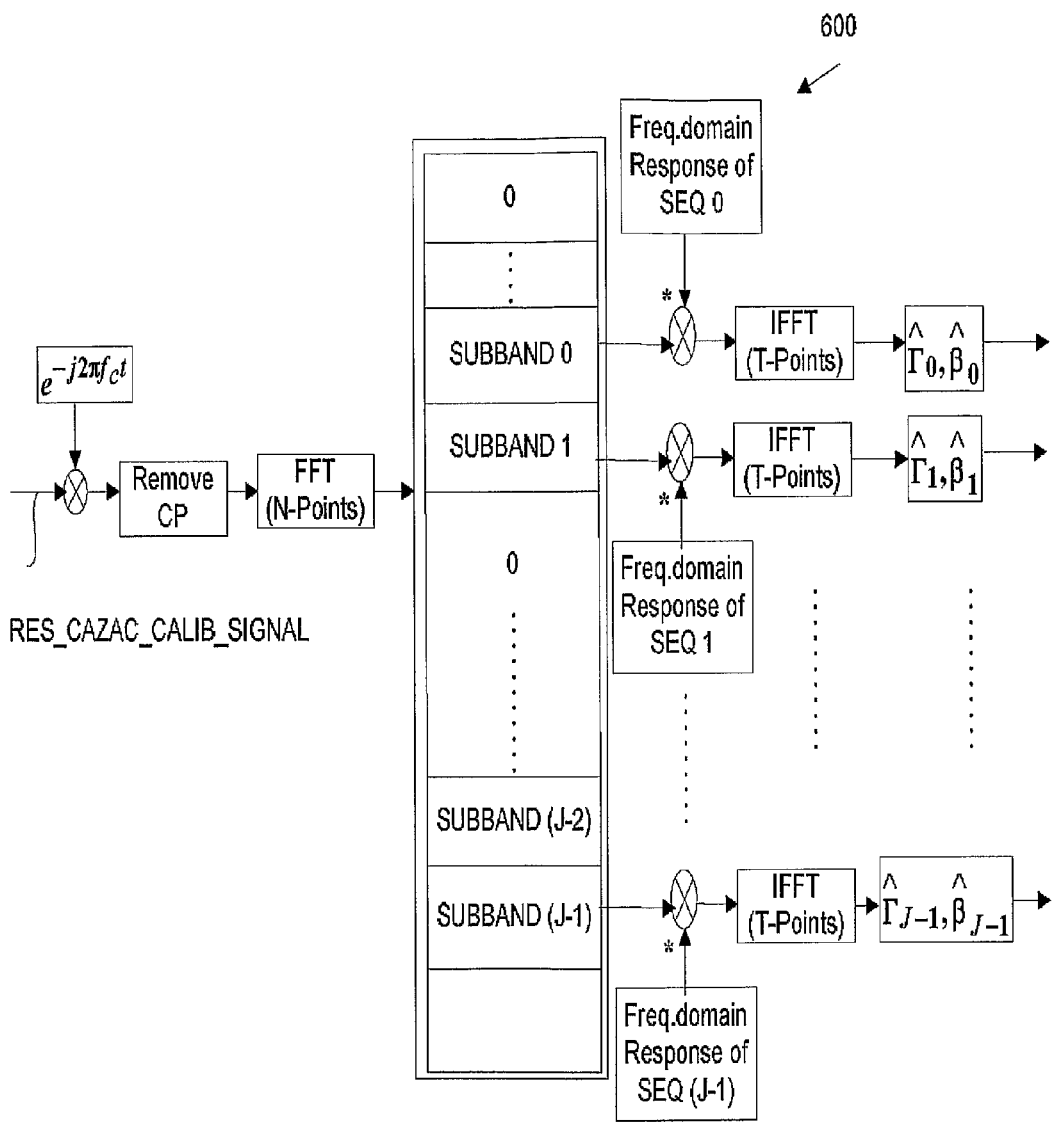
FIG. 6 illustrates an example of a receiving process of a receiver part according to an exemplary embodiment of the present invention.

Referring to FIG. 6 there is illustrated the functions of a receiver part 600 in accordance with exemplary embodiments of the present invention, for enabling detection of a group delay for performing calibration of the radio base station. The functions of the receiver part 600 can be defined as a reception process which can be viewed as a reverse procedure as compared to the transmission process. As shown in FIG. 6, the receiver part 600 is configured to receive RES_PCAZAC_CALIB_SIGNAL which has been deteriorated by the induced group delay (per subband) and by the noise AWGN, and the receiver part 600 is further configured to downconvert RES_PCAZAC_CALIB_SIGNAL to a baseband CAZAC calibration signal by multiplying RES_PCAZAC_CALIB_SIGNAL with $e^{-j2\pi f_c t}$. Subsequently, the receiver part 600 is configured to remove the CP from the baseband CAZAC calibration signal. Then, the receiver part 600 is configured to transform/convert the baseband CAZAC calibration signal from time domain into frequency domain by applying a N-points FFT operation. The transformed signal is denoted here R(k) where k=0, 1, 2, . . . , (N-1). Thereafter, the receiver part 600 is configured to extract from R(k), CAZAC calibration sequences of length M. Each extracted calibration sequence, denoted $R_i(n)$ where n=0, 1, 2, . . . , (M-1) and where i=0, 1, 2, . . . , (J-1) is then mapped into a dedicated subband i of the available bandwidth. In other words, extracted calibration sequence $R_0(n)$ is mapped to subband 0; extracted CAZAC calibration sequence $R_1(n)$ is mapped to subband 1; . . . ; and extracted calibration sequence $R_{(J-1)}(n)$ is mapped to subband (J-1). The receiver part 600 is further configured to determine, for each mapped CAZAC calibration sequence, a recovered CAZAC calibration sequence by multiplying a conjugate of the predetermined frequency response of the mapped CAZAC calibration sequence with the corresponding mapped CAZAC calibration sequence. The predetermined frequency response of CAZAC calibration sequence $R_i(n)$, which as described earlier is considered known to the receiver part 600, is denoted $P_i(n)$. Thus $P_i(n)$ represent frequency domain response of SEQ i where i=0, 1, 2, . . . , J-1. The conjugate of $P_i(n)$ is $[P_i(n)]^*$ and is multiplied with $R_i(n)$ to give the recovered CAZAC calibration sequence $C_i(n)$ of length M, given by equation (3) below:

$$C_i(n) = R_i(n) \times [P_i(n)]^*, n=0, 1, \ldots, (M-1) \qquad (3)$$

The receiver part 600 is further configured to convert/transform each recovered CAZAC calibration sequence $C_i(n)$ from frequency domain into domain by means of a T-points IFFT operation giving $c_i(n)$, n=0, 1, . . . , (T-1), where T is predetermined and is selected less than M. The (T−M) positions of each converted recovered CAZAC calibration sequence are padded with zeros in order to achieve accuracy of estimating group delay.

The receiver part 600 is further configured to jointly estimate, for each converted recovered CAZAC calibration sequence, a group delay by selecting a maximum amplitude value of the converted recovered CAZAC calibration sequence and then determining a corresponding time index where the maximum amplitude value occurs. In other words, the receiver part 600 is configured to select the absolute/maximum value of each $c_i(n)$ i.e. $\max_i[c_i(n)]$; to determine the position index denoted $\tau_i$ where maximum value $\max_i[c_i(n)]$ occurs and to estimate the group delay for each subband i, denoted $\hat{\Gamma}_i$ using equation (4) below:

$$\hat{\Gamma}_i = T - \tau_i \qquad (4)$$

The receiver part 600 is also configured to estimate, for each subband, an amplitude attenuation factor denoted $\hat{\beta}_i$ using equation (5) below:

$$\hat{\beta}_i = \max_i[M^*(M/T)] \qquad (5)$$

The receiver part 600 is further configured to estimate a resulting group delay $$\hat{\Gamma} = \sum_{i=0}^{J-1} \hat{\Gamma}_i$$

by summing all estimated group delays of all converted recovered CAZAC calibration sequences. The receiver part 600 may further estimate a resulting amplitude attenuation factor $$\hat{\beta} = \sum_{i=0}^{J-1} \hat{\beta}_i$$

by summing the estimated amplitude attenuation factors.

The above described functions of the receiver part in accordance with the exemplary embodiments of the present invention can be performed by a receiver part circuitry or a circuit of the receiver part or the receiver part circuit or a receiver part processor and/or a combination of the above. In other words, "the receiver part is configured to . . . " describing the functions of the receiver part can instead be rephrased/replaced to/by "the circuit is configured to . . . " or " the receiver part circuit is configured to . . . " or "the circuitry of the receiver part is configured to . . . " or "the receiver part circuitry is configured to . . . " or " the processor of the receiver part is configured to . . . " or " the receiver part processor is configured to . . . ".

Referring to FIG. 7A there is illustrated a table including simulation parameters used to evaluate the performance of a transceiver including the transmission part and receiver part in accordance with the previously described embodiments of the present invention. The simulations parameters and their exemplary values are: M=839, J=8, N=24576, T=2048, Root number (or sequence root umber) t=265 and the cyclic shift number is equal 93. The root number and the cyclic shift number are selected parameters for CAZAC definition.

It should be noted the values given above and in the table of FIG. 7A are only examples of simulations parameters, meaning that the exemplary embodiments of the present invention are not restricted to these values. However and as previously described, the value of N is selected larger that M and T and the value of T is selected larger than M for the reasons previously described.

FIG. 7B illustrates a table presenting the probability of estimating $\hat{\Gamma}_i$ when 8 subbands are continuously or discontinuously allocated in a transmitted symbol with N-point subcarriers. As shown, the signal to noise ration (SNR) is relatively high for the calibration link. The SNR is at least 30 dB. As shown, the probably of estimating the group delay per subband i.e. $\hat{\Gamma}_i$ is 100%. This means that, by means of the transmission and receiver part of the present invention, the group delay can be estimated without any error. Two further factors can be deduced from the simulation results: 1) the length M of the transmitted sequence is adequately chosen (here M=839), which leads to a very high energy accumulation; 2) the SNR is more than satisfactory (more than 30 dB).

Figure 8:
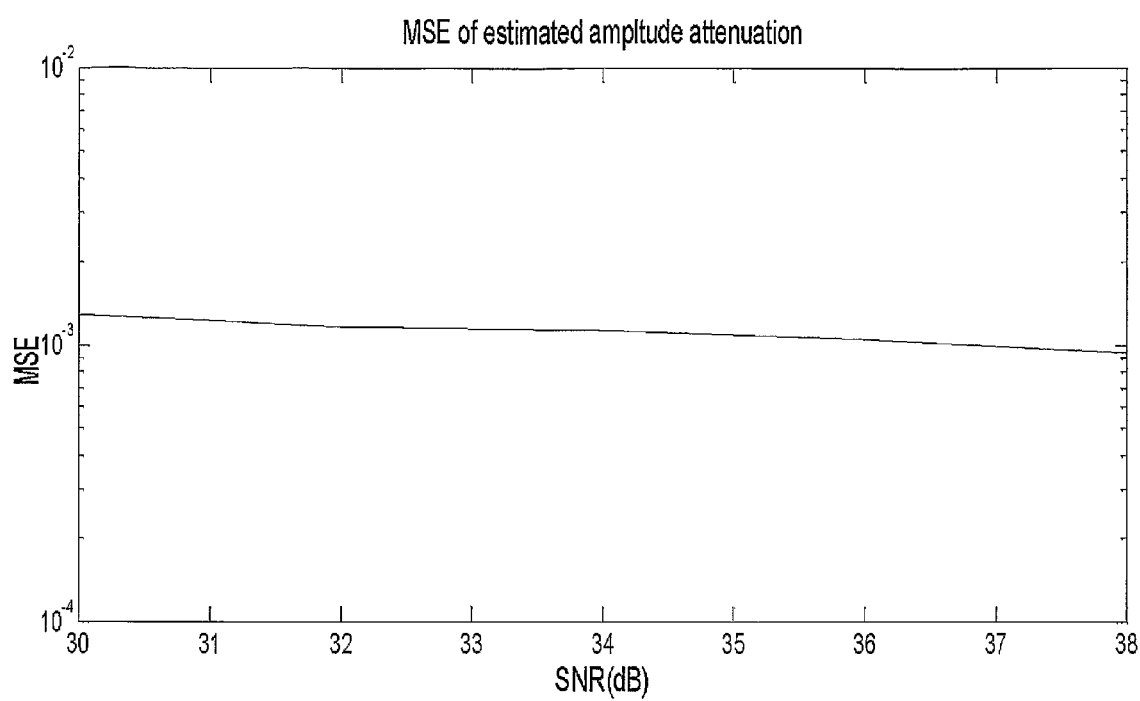
FIG. 8 is a graph illustrating a mean square error of estimated amplitude attenuation vs. SNR.

Referring to FIG. 8 there is depicted the mean square error (MSE) of the estimated amplitude attenuation factor based on the simulation parameters depicted in FIG. 7A. As shown, the MSE of amplitude attenuation factor decreases with increased SNR which means that the system performance is improved using the previously describes exemplary embodiments of the present invention when performing calibration. It should be mentioned that in real systems, the requirement for calibration error is usually set to approximately 1 dB. From FIG. 8 it is clear that the MSE is close to $10^{-3}$ which means that the performance loss due to calibration error is very little since it is far less than 1 dB.

As mentioned earlier, an advantage with the exemplary embodiments of the present invention is that the group delay is jointly detected and estimated thereby achieving reliable calibration of the transceiver of a radio base station, comprising the transmission par and the receiver part. This leads to that reciprocity and antenna gain(s) are not unnecessarily degraded thereby improving performance of the wideband system where the radio base station is deployed.

Figure 9:
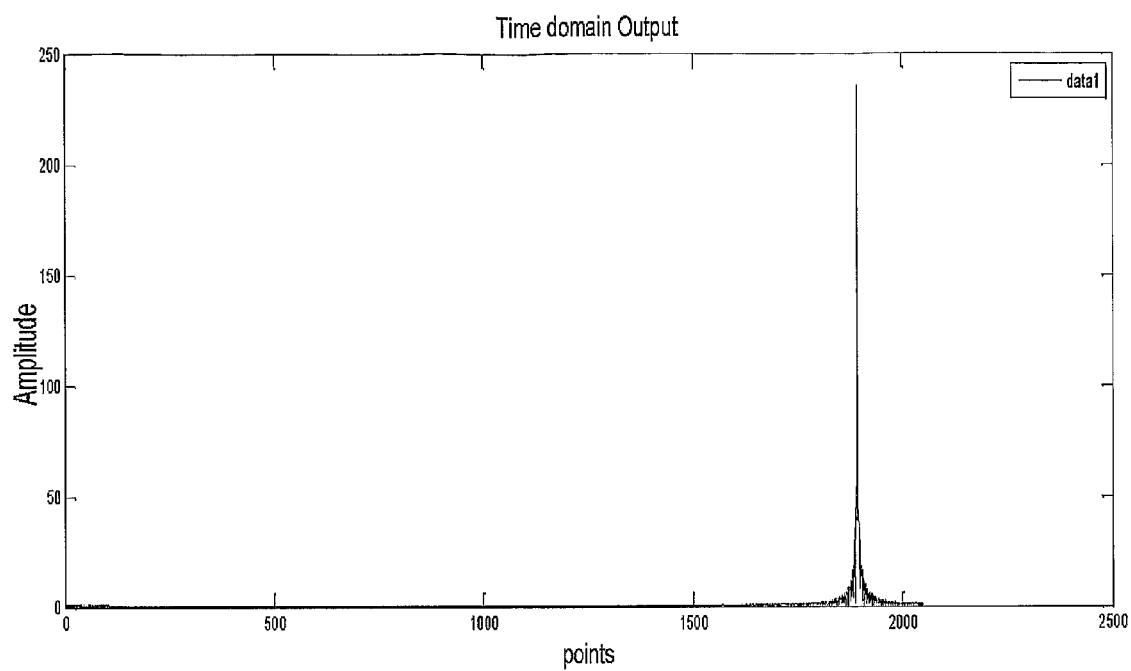
FIG. 9 is another graph showing the conversion of the group delay detection process to time domain by means of IFFT.

Furthermore and as previously described, the detection and estimation of the group delay is performed in time domain by means of the IFFT so that the noise effect can be mostly removed as shown in FIG. 9 where it is clear that the sample (data1) (located at approximately 1900 points) shows a peak value of group delay which is higher (i.e. very distinctive) than other samples, which means that the desired sample of group delay can be easily detected and estimated. This leads to that full use of the energy accumulation is achieved so that the system is resistant to random noise and the achieved SNR is high. From FIG. 9 it is also clear that the conversion to time domain, by IFFT, of the group delay detection process is resistant to random noise.

A further advantage with the exemplary embodiments of the present invention is that the group delay detection range is spread based on the available bandwidth of the communication system and by carefully selecting the parameters J, M, N and T. This will lead to that the measurable bandwidth can be very flexible. For example, if the measurable bandwidth is 200 MHz, the coherent bandwidth where the same (or almost the same) group delay is of concern is approximately 10 MHz. In this case, J should be chosen to be equal to e.g. 20; M should be about 42 and T should be selected to be equal to e.g. 2048 or 4096, etc. for achieving the requirements on accuracy. The symbol length N should also be selected adequately.

Figure 10:
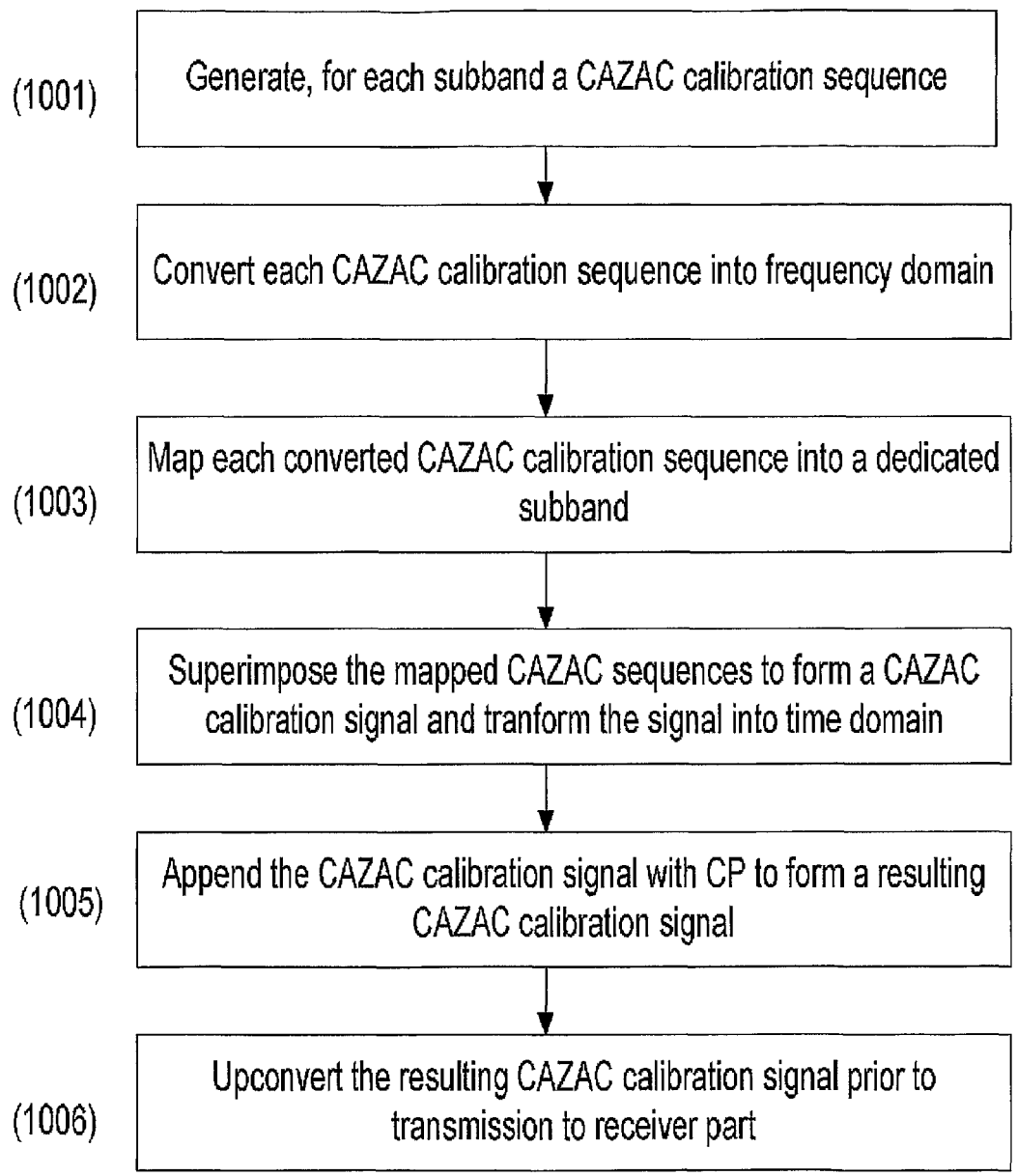
FIG. 10 is a diagram illustrating a flowchart of a method for use in transmission part, according to exemplary embodiments of the present invention.

FIG. 10 summarizes the main steps of the method/process performed by the transmission part (or as mentioned earlier, the circuit or the circuitry or the processor of the transmission part) in accordance with the previously described embodiments of the present invention. As shown, the mains steps comprise:

(1001) generating in time domain, for each subband of the available bandwidth, a CAZAC calibration sequence having a predefined length (M);

(1002) converting each CAZAC calibration sequence into frequency domain by using a M-points FFT operation where M further represents the number of contiguous subcarriers for each subband;

(1003) mapping each converted CAZAC calibration sequence into a dedicated subband;

(1004) superimposing the mapped CAZAC calibration sequences to form a CAZAC calibration signal which is further transformed from frequency domain into time domain using an N-points IFFT operation, where N is a length of a symbol;

(1005) appending the transformed CAZAC calibration signal with a cyclic prefix, CP, to form a resulting CAZAC calibration signal;

(1006) upconverting the resulting CAZAC calibration signal to a carrier frequency prior to transmitting the upconverted resulting CAZAC calibration signal, said transmitted resulting CAZAC calibration signal passing a radio frequency, RF, chain before reaching a receiver part of the transceiver.

Additional details regarding the transmission part have already been thoroughly described in detail and are there not repeated again.

Figure 11:
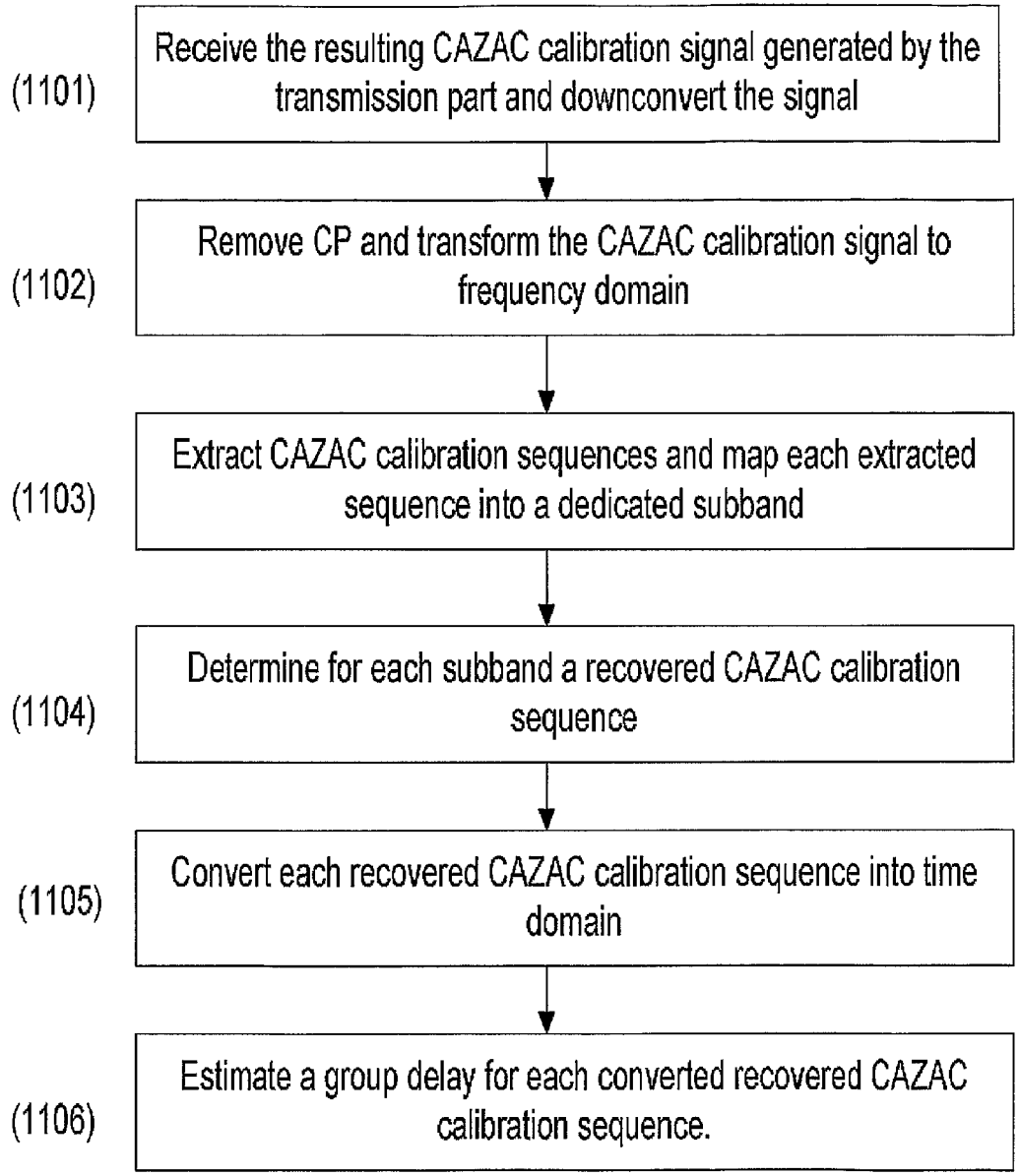
FIG. 11 is a diagram illustrating a flowchart of a method for use in receiver part, according to exemplary embodiments of the present invention.

FIG. 11 summarizes the main steps of the method/process performed by the receiver part (or as mentioned earlier, the circuit or the circuitry or the processor of the receiver part) in accordance with the previously described embodiments of the present invention. As shown, the mains steps comprise:

(1101) receiving from the transmission part a resulting CAZAC calibration signal and downconverting the received resulting CAZAC calibration signal into a baseband CAZAC calibration signal;

(1102) removing the CP of the baseband CAZAC calibration signal and transforming the baseband CAZAC calibration signal from time domain to frequency domain using a N-points FFT operation, the FFT, where N is a length of a symbol;

(1103) extracting from the transformed CAZAC calibration signal, CAZAC calibration sequences of a predefined length M and mapping each extracted CAZAC calibration sequence of length M into a dedicated subband of the available bandwidth;

(1104) determining for each mapped CAZAC calibration sequence, a recovered CAZAC calibration sequence by multiplying a predefined conjugated frequency response of the mapped CAZAC calibration sequence with the corresponding mapped CAZAC calibration sequence, (1105) converting each recovered CAZAC calibration sequence into time domain using an IFFT, operation, the IFFT having a predefined number of points T;

(1106) jointly estimating, for each converted recovered CAZAC calibration sequence, a group delay by selecting a maximum amplitude value of the converted recovered CAZAC calibration sequence and determining a corresponding time index where the maximum amplitude value occurs.

Additional details regarding the receiver part have already been thoroughly described in detail and are there not repeated again.

As previously described the transmission part and the receiver part can be implemented in a transceiver which can be further implemented in a radio base station.

The present invention and its embodiments can be realized in many ways. For example, one embodiment of the present invention includes a computer-usable or computer-readable medium comprising a computer program code configured to cause a processor to execute instructions stored on the medium. The executable instructions perform the method step of the present invention as previously described and as presented in the appended method claims.

Note that while the invention has been described in terms of several exemplary embodiments, it is contemplated that alternatives, modifications, permutations and equivalents thereof will become apparent upon reading of the specifications and upon study of the drawings. It is therefore intended that the following appended claims include such alternatives, modifications, permutations and equivalents as fall within the scope of the present invention.

The invention claimed is:

1. A transceiver for a radio base station of a wideband communication system, wherein said transceiver is configured to detect a group delay for performing calibration and comprises a transmission part that includes a circuit that is configured to:
split an available system bandwidth into multiple, J, groups of contiguous subcarriers, each group of contiguous subcarriers representing a subband of the available bandwidth;
generate, for each subband, a constant amplitude zero auto correlation (CAZAC) calibration sequence having a predefined length, M, the CAZAC calibration sequence being generated in the time domain;
convert each CAZAC calibration sequence into frequency domain by using an M-point fast fourier transformation (FFT) operation where M further represents the number of contiguous subcarriers for each subband;
map each converted CAZAC calibration sequence into a dedicated subband;
superimpose the mapped CAZAC calibration sequences to form a CAZAC calibration signal which is further transformed from the frequency domain into the time domain using an N-point inverse FFT (IFFT) operation, where N is a length of a symbol;
append the transformed CAZAC calibration signal with a cyclic prefix (CP) to form a resulting CAZAC calibration signal; and
upconvert the resulting CAZAC calibration signal to a carrier frequency prior to transmitting the upconverted resulting CAZAC calibration signal, said transmitted resulting CAZAC calibration signal passing through a radio frequency (RF) chain, which induces different group delays in subbands before reaching a receiver part of the transceiver.

2. The transceiver of claim 1, wherein each CAZAC calibration sequence is given by:

$$x_i[n] = \exp(j2\pi(N_{zc}-1)t(t+1)/N_{zc},$$

where n is an index of a length of a respective CAZAC calibration sequence, i is an index of a dedicated subband, $N_{zc}$ is a prime number and t is a sequence root.

3. The transceiver of claim 2, wherein the frequency domain of each converted CAZAC calibration sequence is given by:

$$X_i(k) = \sum_{k=0}^{k=N_{zc}-1} x_i[n]\exp(-j2\pi nk/N),$$

where k=0, 1, 2, (N−1), and n=0, 1, 2, . . . ,(N−1), and where N is larger than the length of a calibration CAZAC sequence.

4. The transceiver of claim 1, wherein the RF chain through which the upconverted resulting CAZAC calibration signal passes includes a digital upconverter (DUC), and a digital-to-analog converter (DAC).

5. The transceiver of claim 1, wherein said transceiver further comprises a receiver part comprising a circuit that is configured to:
receive the transmitted resulting CAZAC calibration signal generated by the transmitter part and downconvert the transmitted resulting CAZAC calibration signal as received into a baseband CAZAC calibration signal;
remove a cyclic prefix (CP) of the baseband CAZAC calibration signal and transform the baseband CAZAC calibration signal from the time domain to the frequency domain using an N-point FFT operation, where N is a length of a symbol;
extract from the transformed CAZAC calibration signal, CAZAC calibration sequences of a predefined length M and map each extracted CAZAC calibration sequence into a dedicated subband of the available bandwidth;
determine, for each mapped CAZAC calibration sequence, a recovered CAZAC calibration sequence by multiplying a predefined conjugated frequency response of the mapped CAZAC calibration sequence with the corresponding mapped CAZAC calibration sequence;
convert each recovered CAZAC calibration sequence into the time domain using an IFFT operation, the IFFT having a predefined number of points T; and
jointly estimate, for each converted recovered CAZAC calibration sequence, a group delay by selecting a maximum amplitude value of the converted recovered CAZAC calibration sequence and determining a corresponding time index where the maximum amplitude value occurs.

6. The transceiver of claim 5, wherein the circuit in the receiver part is further configured to determine a resulting group delay by adding the group delays of all converted recovered CAZAC calibration sequences.

7. The transceiver of claim 5, wherein zeros are padded to each converted CAZAC calibration sequence in positions of the converted CAZAC calibration sequence corresponding to T−M, so as to achieve accuracy when estimating the group delay of each converted recovered CAZAC calibration sequence.

8. The transceiver of claim 5, wherein the symbol length N used for the FFT operation is larger than the length of each recovered CAZAC calibration sequence and also larger than T.

9. The transceiver of claim 5, wherein each recovered CAZAC calibration sequence is given by $$C_i(k)=R_i(k)\times[p_i(k)]^*, k=0, 1, \ldots, (M-1)$$

where i denotes an group index, $R_i(k)$ corresponds to a mapped CAZAC calibration sequence, and $[P_i(k)]^*$ corresponds to a predefined conjugated frequency response of the mapped CAZAC calibration sequence.

10. The transceiver of claim 9, wherein an estimate of the group delay of a recovered CAZAC calibration sequence is given by:

$$\hat{\Gamma}_i = T - \tau_i$$

where T is chosen larger than M and $\tau_i$ is the time index where the maximum amplitude value 11. The transceiver of claim 10, wherein the circuit is further configured to determine, for each recovered CAZAC calibration sequence, an amplitude attenuation given by $$\hat{\beta}_i = \max_i/[M^*(M/T)].$$

12. A method for performing in a transceiver of a radio base station configured for use in a wideband communication system, said method enabling detection of a group delay for performing calibration and the method comprising in a transmit part of the transceiver:
  splitting an available system bandwidth into multiple, J, groups of contiguous subcarriers, each group of contiguous subcarriers representing a subband of the available bandwidth;
  generating in time domain, for each subband of the available bandwidth, a CAZAC calibration sequence having a predefined length, M;
  converting each CAZAC calibration sequence into frequency domain by using a M-points FFT operation where M further represents the number of contiguous subcarriers for each subband;
  mapping each converted CAZAC calibration sequence into a dedicated subband;
  superimposing the mapped CAZAC calibration sequences to form a CAZAC calibration signal which is further transformed from frequency domain into time domain using an N-points IFFT operation, where N is a length of a symbol;
  appending the transformed CAZAC calibration signal with a cyclic prefix, CP, to form a resulting CAZAC calibration signal;
  upconverting the resulting CAZAC calibration signal to a carrier frequency prior to transmitting the upconverted resulting CAZAC calibration signal, said transmitted resulting CAZAC calibration signal passing through a radio frequency (RF) chain, which induces different group delays in subbands before reaching a receiver part of the transceiver.

13. The method of claim 12, further comprising in a receiver part of the transceiver:
  receiving from the transmission part the transmitted resulting CAZAC calibration signal generated by the transmission part, and downconverting the transmitted resulting CAZAC calibration signal as received into a baseband CAZAC calibration signal;
  removing a cyclic prefix, CP, of the baseband CAZAC calibration signal and transforming the baseband CAZAC calibration signal from time domain to frequency domain using a N-points FFT operation, the FFT, where N is a length of a symbol;
  extracting from the transformed CAZAC calibration signal, CAZAC calibration sequences of a predefined length M and mapping each extracted CAZAC calibration sequence of length M into a dedicated subband of the available bandwidth;
  determining for each mapped CAZAC calibration sequence, a recovered CAZAC calibration sequence by multiplying a predefined conjugated frequency response of the mapped CAZAC calibration sequence with the corresponding mapped CAZAC calibration sequence;
  converting each recovered CAZAC calibration sequence into time domain using an IFFT, operation, the IFFT having a predefined number of points T;
  jointly estimating, for each converted recovered CAZAC calibration sequence, a group delay by selecting a maximum amplitude value of the converted recovered CAZAC calibration sequence and determining a corresponding time index where the maximum amplitude value occurs.

* * * * *